(12) United States Patent
Wood et al.

(10) Patent No.: US 11,702,067 B2
(45) Date of Patent: Jul. 18, 2023

(54) MULTI-MODEL SWITCHING ON A COLLISION MITIGATION SYSTEM

(71) Applicant: UATC, LLC, San Francisco, CA (US)

(72) Inventors: Matthew Shaw Wood, Pittsburgh, PA (US); William M. Leach, San Francisco, CA (US); Scott C. Poeppel, Pittsburgh, PA (US); Nicholas G. Letwin, Pittsburgh, PA (US); Noah Zych, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 273 days.

(21) Appl. No.: 17/025,454

(22) Filed: Sep. 18, 2020

(65) Prior Publication Data

US 2021/0031801 A1 Feb. 4, 2021

Related U.S. Application Data

(63) Continuation of application No. 16/052,899, filed on Aug. 2, 2018, now Pat. No. 10,780,880, which is a (Continued)

(51) Int. Cl.
*B60W 10/184* (2012.01)
*G01S 13/86* (2006.01)
(Continued)

(52) U.S. Cl.
CPC .......... *B60W 30/09* (2013.01); *B60W 10/184* (2013.01); *B60W 10/20* (2013.01);
(Continued)

(58) Field of Classification Search
USPC .......................................................... 701/26
See application file for complete search history.

(56) References Cited

U.S. PATENT DOCUMENTS

| 5,612,883 | A | 3/1997 | Shaffer et al. |
| 5,684,694 | A | 11/1997 | Ishino et al. |

(Continued)

FOREIGN PATENT DOCUMENTS

| CN | 1367886 | 9/2002 |
| CN | 101636304 | 1/2010 |

(Continued)

OTHER PUBLICATIONS

PCT International Search Report and Written Opinion for PCT/US2018/038996, dated Sep. 20, 2018, 13 pages.
(Continued)

*Primary Examiner* — Tyler D Paige
(74) *Attorney, Agent, or Firm* — Dority & Manning, P.A.

(57) ABSTRACT

Systems and methods for controlling an autonomous vehicle are provided. In one example embodiment, a computer-implemented method includes receiving data indicative of an operating mode of the vehicle, wherein the vehicle is configured to operate in a plurality of operating modes. The method includes determining one or more response characteristics of the vehicle based at least in part on the operating mode of the vehicle, each response characteristic indicating how the vehicle responds to a potential collision. The method includes controlling the vehicle based at least in part on the one or more response characteristics.

20 Claims, 6 Drawing Sheets

Related U.S. Application Data continuation of application No. 15/668,196, filed on Aug. 3, 2017, now Pat. No. 10,065,638.

(51) Int. Cl.
| | |
|---|---|
| *G05D 1/02* | (2020.01) |
| *G08G 1/16* | (2006.01) |
| *B60W 30/09* | (2012.01) |
| *G05D 1/00* | (2006.01) |
| *B60W 10/20* | (2006.01) |
| *B60W 30/08* | (2012.01) |
| *B60W 50/08* | (2020.01) |
| *B60W 30/095* | (2012.01) |
| *B60W 60/00* | (2020.01) |
| *B60W 50/14* | (2020.01) |
| *B60W 40/08* | (2012.01) |
| *G01S 13/931* | (2020.01) |
| *B60W 50/00* | (2006.01) |

(52) U.S. Cl.
CPC .......... *B60W 30/08* (2013.01); *B60W 30/095* (2013.01); *B60W 30/0953* (2013.01); *B60W 30/0956* (2013.01); *B60W 50/082* (2013.01); *B60W 50/14* (2013.01); *B60W 60/0015* (2020.02); *G01S 13/867* (2013.01); *G05D 1/0088* (2013.01); *G05D 1/0212* (2013.01); *G05D 1/0238* (2013.01); *G08G 1/163* (2013.01); *G08G 1/166* (2013.01); *G08G 1/167* (2013.01); *B60W 2040/0881* (2013.01); *B60W 2050/0095* (2013.01); *B60W 2050/143* (2013.01); *B60W 2420/403* (2013.01); *B60W 2420/42* (2013.01); *B60W 2420/52* (2013.01); *G01S 13/865* (2013.01); *G01S 13/931* (2013.01); *G01S 2013/9323* (2020.01)

(56) References Cited

U.S. PATENT DOCUMENTS

| | | | |
|---|---|---|---|
| 5,684,696 | A | 11/1997 | Rao et al. |
| 6,055,042 | A | 4/2000 | Sarangapani |
| 6,151,539 | A | 11/2000 | Bergholz et al. |
| 6,169,572 | B1 | 1/2001 | Sogawa |
| 8,175,796 | B1 | 5/2012 | Blackburn |
| 8,195,394 | B1 | 6/2012 | Zhu et al. |
| 8,700,251 | B1 | 4/2014 | Zhu et al. |
| 8,855,849 | B1 | 10/2014 | Ferguson et al. |
| 8,849,494 | B1 | 11/2014 | Herbach et al. |
| 8,880,273 | B1 | 11/2014 | Chatham |
| 9,187,088 | B1 | 11/2015 | Ferguson et al. |
| 9,201,242 | B2 | 12/2015 | Miyawaki et al. |
| 9,201,424 | B1 | 12/2015 | Ogale |
| 9,205,835 | B2 | 12/2015 | Stein et al. |
| 9,558,584 | B1 | 1/2017 | Lo |
| 9,720,412 | B1 | 8/2017 | Zhu et al. |
| 9,805,601 | B1 | 10/2017 | Fields et al. |
| 9,880,560 | B2 | 1/2018 | Han et al. |
| 9,886,856 | B2 | 2/2018 | Dougherty |
| 9,956,963 | B2 | 5/2018 | Kumar |
| 10,065,638 | B1* | 9/2018 | Wood ................... B60W 30/09 |
| 10,086,782 | B1 | 10/2018 | Konrardy et al. |
| 10,386,856 | B2* | 8/2019 | Wood ................... B60W 30/09 |
| 10,818,105 | B1 | 10/2020 | Konrardy et al. |

| | | | |
|---|---|---|---|
| 2003/0083818 | A1 | 5/2003 | Tojima |
| 2007/0078600 | A1 | 4/2007 | Fregene |
| 2007/0219720 | A1 | 9/2007 | Trepagnier et al. |
| 2009/0292468 | A1 | 11/2009 | Wu et al. |
| 2010/0106356 | A1 | 4/2010 | Trepagnier et al. |
| 2010/0228427 | A1 | 11/2010 | Anderson et al. |
| 2012/0310466 | A1 | 12/2012 | Fairfield et al. |
| 2013/0099943 | A1 | 4/2013 | Subramanya |
| 2014/0032049 | A1 | 1/2014 | Moshchuk |
| 2014/0240502 | A1 | 8/2014 | Strauss et al. |
| 2015/0222859 | A1 | 8/2015 | Schweid et al. |
| 2015/0242953 | A1 | 8/2015 | Suiter |
| 2015/0314780 | A1 | 11/2015 | Stenneth |
| 2016/0063710 | A1 | 3/2016 | Tanaka |
| 2016/0207534 | A1 | 7/2016 | Nishimura et al. |
| 2016/0251016 | A1 | 9/2016 | Pallett et al. |
| 2017/0135277 | A1 | 5/2017 | Hiramatsu et al. |
| 2017/0139418 | A1 | 5/2017 | Hiramatsu et al. |
| 2017/0162050 | A1 | 6/2017 | Chen et al. |
| 2017/0183007 | A1 | 6/2017 | Oh et al. |
| 2017/0227957 | A1 | 8/2017 | Cesarano |
| 2017/0248688 | A1 | 8/2017 | Campbell et al. |
| 2017/0248953 | A1 | 8/2017 | Kelley |
| 2017/0248964 | A1 | 8/2017 | Kentley et al. |
| 2017/0285656 | A1 | 10/2017 | Kohlenberg et al. |
| 2017/0291544 | A1 | 10/2017 | Ishihara et al. |
| 2017/0372431 | A1 | 12/2017 | Perl et al. |
| 2018/0004213 | A1 | 1/2018 | Absmeier et al. |
| 2018/0029592 | A1 | 2/2018 | Trombley |
| 2018/0039273 | A1 | 2/2018 | Delp et al. |
| 2018/0067490 | A1 | 3/2018 | Pollach et al. |
| 2018/0067492 | A1 | 3/2018 | Order et al. |
| 2018/0072313 | A1 | 3/2018 | Stenneth |
| 2018/0120845 | A1 | 5/2018 | Lambermont |
| 2018/0141544 | A1 | 5/2018 | Xiao |
| 2018/0148047 | A1 | 5/2018 | Kadetotad |
| 2018/0188371 | A1 | 7/2018 | Bao et al. |
| 2018/0247160 | A1 | 8/2018 | Rohani et al. |
| 2018/0245958 | A1 | 9/2018 | Lo |
| 2018/0262739 | A1 | 9/2018 | Hunt |
| 2022/0274639 | A1* | 9/2022 | Park ..................... B62D 1/185 |

FOREIGN PATENT DOCUMENTS

| | | |
|---|---|---|
| CN | 104590250 | 5/2013 |
| CN | 104787045 | 7/2015 |
| CN | 104859649 | 8/2015 |
| CN | 105235681 | 1/2016 |
| CN | 105270414 | 1/2016 |
| CN | 105358399 | 2/2016 |
| CN | 105835878 | 8/2016 |
| EP | 2045161 | 4/2009 |
| GB | 201511700 | 8/2015 |
| JP | 2003141692 | 5/2003 |
| JP | 2010033441 | 2/2010 |
| JP | 2015072611 | 4/2015 |
| JP | 2015217762 | 12/2015 |
| JP | 2016517554 | 6/2016 |
| JP | 2016192722 | 11/2016 |
| WO | WO 2016122744 | 8/2016 |

OTHER PUBLICATIONS

U.S. Appl. No. 15/637,539, filed Jun. 29, 2017, 34 pages.
U.S. Appl. No. 16/429,437, filed Jun. 3, 2019, 34 pages.
U.S. Appl. No. 17/360,599, filed Jun. 28, 2021, 36 pages.

* cited by examiner

MULTI-MODEL SWITCHING ON A COLLISION MITIGATION SYSTEM

PRIORITY CLAIM

The present application is a continuation of U.S. application Ser. No. 16/052,899 having a filing date of Aug. 2, 2018, which is a continuation of U.S. application Ser. No. 15/668,196 having a filing date of Aug. 3, 2017. Applicant claims priority to and the benefit of each of such applications and incorporate all such applications herein by reference in its entirety.

FIELD

The present disclosure relates generally to operating modes of an autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for controlling an autonomous vehicle. The method includes receiving, by a computing system comprising one or more computing devices, data indicative of an operating mode of the autonomous vehicle, the autonomous vehicle configured to operate in a plurality of operating modes. The method includes determining, by the computing system, one or more response characteristics of the autonomous vehicle based at least in part on the operating mode of the autonomous vehicle, each response characteristic indicating how the autonomous vehicle responds to a potential collision. The method includes controlling, by the computing system, the autonomous vehicle based at least in part on the one or more response characteristics.

Another example aspect of the present disclosure is directed to a computing system for controlling an autonomous vehicle. The computing system includes one or more processors, and one or more tangible, non-transitory, computer readable media that collectively store instructions that when executed by the one or more processors cause the computing system to perform operations. The operations include receiving data indicative of an operating mode of the autonomous vehicle, wherein the autonomous vehicle is configured to operate in a plurality of operating modes. The operations include determining one or more response characteristics of the autonomous vehicle based at least in part on the operating mode of the autonomous vehicle, each response characteristic indicating how the autonomous vehicle responds to a potential collision. The operations include controlling the autonomous vehicle based at least in part on the one or more response characteristics.

Yet another example aspect of the present disclosure is directed to an autonomous vehicle. The autonomous vehicle includes one or more processors, and one or more tangible, non-transitory, computer readable media that collectively store instructions that when executed by the one or more processors cause the autonomous vehicle to perform operations. The operations include receiving data indicative of an operating mode of the autonomous vehicle, wherein the autonomous vehicle is configured to operate in a plurality of operating modes. The operations include determining one or more response characteristics of the autonomous vehicle based at least in part on the operating mode of the autonomous vehicle, each response characteristic indicating how the autonomous vehicle responds to a potential collision. The operations include controlling the autonomous vehicle based at least in part on the one or more response characteristics.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which make reference to the appended figures, in which.

DETAILED DESCRIPTION

Figure 1:
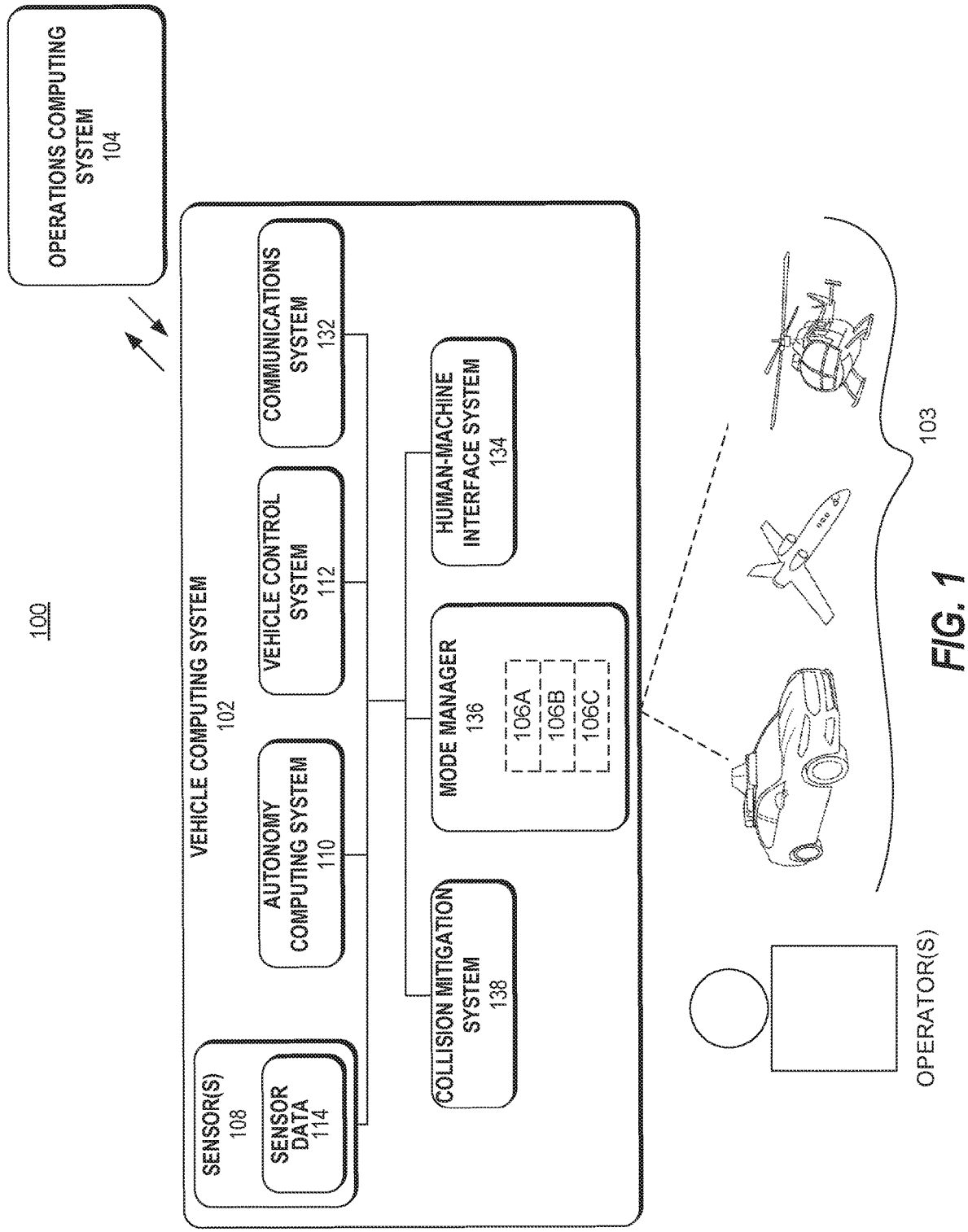
FIG. 1 depicts an example system overview according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to switching between a plurality of operating modes on a collision mitigation system located on-board an autonomous vehicle to improve the safety, customizability, and flexibility of the autonomous vehicle. A collision mitigation system is a safety feature meant to safeguard against failures, shortcomings, or unforeseeable events when operating an autonomous vehicle. A collision mitigation system can detect potential collisions with objects in a surrounding environment of an autonomous vehicle and control the autonomous vehicle to avoid the potential collision. An autonomous vehicle can calibrate a collision mitigation system based at least in part on an operating mode of the autonomous vehicle. For example, if an autonomous vehicle is operating in autonomous mode, it can calibrate an on-board collision mitigation system to provide an indication to an on-board autonomy computing system for each potential collision that is detected. Whereas, if an autonomous vehicle is operating in manual mode, it can calibrate a collision mitigation system to flash a warning light to a driver if a potential collision is substantially likely to occur (e.g., if the potential collision is associated with a probability of occurring that is greater than a predetermined value, or if a severity level of the potential collision is above a predetermined threshold, etc.). Conditions and tolerances of how a collision mitigation system responds to a potential collision are herein referred to as response characteristic(s) of the autonomous vehicle. An autonomous vehicle can receive data indicative of an operating mode, determine one or more response characteristic(s) of the autonomous vehicle associated with the operating mode, and control the autonomous vehicle based at least in part on the one or more response characteristic(s). In this way, the autonomous vehicle can include a multi-modal collision mitigation system that improves the safety of the vehicle and objects surrounding the vehicle.

An autonomous vehicle can include a vehicle computing system that implements a variety of systems on-board the autonomous vehicle (e.g., located on or within the autonomous vehicle). For instance, the vehicle computing system can include an autonomy computing system (e.g., for planning autonomous navigation), a mode manager (e.g., for setting an operating mode of an autonomous vehicle), a human-machine interface system (e.g., for receiving and/or providing information to an operator of an autonomous vehicle) that includes one or more external indicator(s) (e.g., for indicating a state of an autonomous vehicle), a collision mitigation system (e.g., for detecting and mitigating potential collisions), and a vehicle interface system (e.g., for controlling one or more vehicle control components responsible for braking, steering, powertrain, etc.). The vehicle interface system of the autonomous vehicle can include one or more vehicle control system(s) for controlling the autonomous vehicle. For instance, the vehicle interface system can include a braking control component, steering control component, acceleration control component, powertrain control component, etc. The vehicle interface system can receive one or more vehicle control signal(s) from one or more system(s) on-board the autonomous vehicle. The vehicle interface system can instruct the one or more vehicle control system(s) to control the autonomous vehicle based on the one or more vehicle control signal(s), for example, in the manner described herein to implement multi-modal switching on a collision mitigation system.

An autonomy computing system of an autonomous vehicle can include one or more sub-systems for planning and executing autonomous navigation. For instance, an autonomy computing system can include, among other sub-systems, a perception system, a prediction system, and a motion planning system that cooperate to perceive a surrounding environment of an autonomous vehicle and determine a motion plan for controlling the motion of the autonomous vehicle accordingly.

A mode manager of an autonomous vehicle can include one or more sub-systems for setting an operating mode of the autonomous vehicle. For instance, a mode manager can receive data indicative of a requested operating mode of an autonomous vehicle from one or more system(s) on-board the autonomous vehicle, one or more operator(s) (e.g., a driver, passenger, service technician, etc.) of the autonomous vehicle, or one or more remote computing device(s) (e.g., of an entity associated with the autonomous vehicle). If a requested operating mode is different from a current operating mode of the autonomous vehicle, a mode manager can determine one or more prerequisite(s) to switching the operating mode of the autonomous vehicle to the requested operating mode. A mode manager can determine whether the prerequisite(s) are met, and if so the mode manager can send one or more control signal(s) to one or more system(s) on-board the autonomous vehicle to set the operating mode of the autonomous vehicle to the requested operating mode. By way of example, if an autonomous vehicle is operating in autonomous mode and receives a request to switch to manual mode, then a mode manager can determine that a prerequisite to switching the operating mode is an availability of a driver. The mode manager can control the autonomous vehicle to display a prompt asking an operator of the autonomous vehicle to affirm that operator will take control of the autonomous vehicle to determine if this prerequisite is met. Continuing this example, the mode manager can determine another perquisite to switching the operating mode is that the driver must be licensed to drive the autonomous vehicle. The mode manager can control the autonomous vehicle to collect and verify the driver's license information to determine if this prerequisite is met. The mode manager can determine yet another prerequisite to switching the operating mode is that the autonomous vehicle is not currently executing a turning maneuver. The mode manager can communicate with one or more other system(s) on-board the autonomous vehicle to determine if this prerequisite is met. If the autonomous vehicle is currently executing a turning maneuver, the mode manager can wait for the turning maneuver to be completed, or the mode manager can determine that the prerequisite is not met.

A human-machine interface system of an autonomous vehicle can include one or more indicator(s) for indicating a state of the autonomous vehicle. For instance, a human-machine interface system can include external indicator(s) such as visual indicator(s) (e.g., a warning light, display, etc.), tactile indicator(s) (e.g., touch response vibration or ultrasound, etc.), and/or audible indicator(s) (e.g., a speaker, etc.). The human-machine interface system can also include one or more indicator(s) for receiving input from an operator (e.g., a microphone, touch-screen display, physical buttons, levers, etc.). A human-machine interface system can receive control signals from one or more system(s) on-board an autonomous vehicle to control the indicator(s). For example, if a trajectory of an autonomous vehicle includes an upcoming left turn, then an autonomy computing system of the autonomous vehicle can control the human-machine interface system (e.g., via one or more control signal(s)) to activate a left turn signal light of the autonomous vehicle. In another example, an operator of an autonomous vehicle can control the human-machine interface system to activate a left turn signal light (e.g., via a turn signal lever).

A collision mitigation system of an autonomous vehicle can include one or more sub-system(s) for detecting and avoiding potential collision(s). For instance, a collision mitigation system can monitor a surrounding environment of an autonomous vehicle using one or more sensors (e.g., a Radio Detection and Ranging (RADAR) system, one or more cameras, and/or other types of image capture devices and/or sensors) to detect a potential collision between the autonomous vehicle and an object in the surrounding environment. When a potential collision is detected, a collision mitigation system can control an autonomous vehicle to avoid the potential collision, based at least in part on an operating mode of the autonomous vehicle. For example, if an autonomous vehicle is operating in autonomous mode and a collision mitigation system detects a potential collision, the collision mitigation system can provide information on the potential collision to an autonomy computing system that can adjust a trajectory of the autonomous vehicle to avoid the potential collision. As another example, if an autonomous vehicle is operating in manual mode and a collision mitigation system detects a potential collision, the collision mitigation system can control a human-machine interface system to display a warning light to operator(s) of the autonomous vehicle.

In some implementations, a collision mitigation system can control a motion of an autonomous vehicle to avoid a potential collision. For example, in the event that a potential collision persists for a time after a collision mitigation system provides information on the potential collision to an autonomy computing system, the collision mitigation system can send one or more control signal(s) to control an autonomous vehicle to execute a braking maneuver. As another example, in the event that a potential collision persists for a time after a collision mitigation system controls an autonomous vehicle to display a warning light, the collision mitigation system can provide one or more control signal(s) to control the autonomous vehicle to execute a braking maneuver.

A collision mitigation system can include a configurable data structure that stores one or more operating mode(s) of an autonomous vehicle, one or more response characteristic(s) of the autonomous vehicle, and one or more corresponding values. The operating mode(s) can include one or more predetermined operating mode(s). For example, the operating mode(s) can include a fully autonomous mode, semi-autonomous mode, manual mode, service mode, and/or other types of modes. The response characteristic(s) can include at least one of a longitudinal control response characteristic, lateral control response characteristic, internal indicator response characteristic, external indicator response characteristic, or other characteristics.

A longitudinal control response characteristic can include, for example, a minimum distance to keep with other vehicles, a maximum acceleration/deceleration rate, a delay before automatically applying brakes, etc. A lateral control response characteristic can include, for example, a minimum/maximum turning radius, a minimum distance of adjacent cars for a lane change, etc. An internal indicator response characteristic can indicate, for example, the system(s) of the autonomous vehicle to which the collision mitigation system should provide information on a potential collision, a delay before automatically applying brakes, etc. An external indicator response characteristic can include, for example, a delay before flashing a warning light to a driver, a volume level of audible alerts, etc.

Each operating mode can be associated with one or more response characteristic(s) and a corresponding value. In some implementations, each operating mode can be associated with different response characteristic(s) among the one or more response characteristic(s). For example, an autonomous mode can be associated with response characteristic(s) that indicate a collision mitigation system should report to an autonomy computing system on-board the autonomous vehicle immediately after detecting a potential collision. In another example, a manual mode can be associated with response characteristic(s) that indicate a collision mitigation system should report to an external indicator system on-board an autonomous vehicle, wait 500 milliseconds before warning a driver of a potential collision, and wait 1000 milliseconds before automatically applying brakes. In some implementations, an operating mode (e.g., service mode) can be associated with response characteristic(s) that indicate a collision mitigation system should report to one or more system(s) on-board an autonomous vehicle, such as both an autonomy computing system and external indicator system, depending on a type of service being performed on the autonomous vehicle.

In some implementations, a collision mitigation system can include an autonomous operating mode. The autonomous mode can be associated with one or more response characteristics and corresponding values that lower a sensitivity threshold of the collision mitigation system for detecting a potential collision. By lowering a sensitivity threshold, a collision mitigation system can identify a greater number of potential collisions. In some implementations, a collision mitigation system can obtain information on a trajectory of an autonomous vehicle from one or more system(s) on-board the autonomous vehicle. For example, the collision mitigation system can obtain trajectory information included in a motion plan determined by an autonomy computing system of the autonomous vehicle (e.g., when the autonomous vehicle is in a fully autonomous operating mode). The trajectory information can include one or more future trajectories of the autonomous vehicle. A collision mitigation system can use the trajectory information to configure one or more regions of interest in a surrounding environment of the autonomous vehicle for detecting a potential collision. For example, if a trajectory of an autonomous vehicle is to "continue forward 500 meters, then turn right," a collision mitigation system can determine a forward-right region (with respect to the autonomous vehicle) as a region of interest. The collision mitigation system can identify one or more object(s) in the forward-right region and detect one or more potential collision(s) with the object(s) in the forward-right region. By configuring the one or more regions of interest, a collision mitigation system can reduce a number of false positives.

In some implementations, the collision mitigation system may not obtain information on a trajectory of an autonomous vehicle from one or more system(s) on-board the autonomous vehicle. For example, when the autonomous vehicle is operating in a manual operating mode, the autonomy computing system can be prevented from generating a motion plan. In this case, the collision mitigation system may not obtain the trajectory of the autonomous vehicle. As another example, when the autonomous vehicle is operating in a manual operating mode, the vehicle's autonomy computing system may continue to generate a motion plan including trajectory information. However, the autonomy system can be blocked from controlling the autonomous vehicle (e.g., blocked from sending motion plans to a mobility controller, via disablement of the mobility controller in the vehicle interface module, etc.). In such a case, the autonomy computing system may not provide the trajectory information to the collision mitigation system. In some implementations, the collision mitigation system may obtain information on a trajectory of an autonomous vehicle from one or more system(s) on-board the autonomous vehicle while in the manual mode, but may ignore such information when performing its operations and functions described herein.

In some implementations, a collision mitigation system can include one or more user-configurable operating mode (s). For example, an autonomous vehicle operating in manual mode can include a plurality of driver modes corresponding to a plurality of drivers. Each driver mode can be associated with one or more response characteristic(s) and a corresponding value to calibrate a collision mitigation system for a specific, individual driver or type of driver. The response characteristic(s) and corresponding value associated with each driver mode can indicate one or more preference(s) of a corresponding driver. For example, a first driver can set a driver mode to calibrate a collision mitigation system to warn the driver of a potential collision. In contrast, a second driver can set a driver mode to calibrate a collision mitigation system to delay or disable a warning indication.

In some implementations, a collision mitigation system can include a plurality of passenger modes corresponding to one or more passenger(s). Each passenger mode can be associated with one or more response characteristic(s) and a corresponding value to calibrate a collision mitigation system for the passenger(s). The response characteristic(s) and corresponding value associated with each passenger mode can indicate one or more preference(s) of corresponding passenger(s). For example, if an autonomous vehicle is carrying a passenger that prefers a smoother, lower speed ride, the autonomous vehicle can set a passenger mode to calibrate a collision mitigation system to automatically implement a braking action sooner and over a longer duration. As another example, if an autonomous vehicle is carrying a passenger that prefers an environmentally friendly ride, the autonomous vehicle can set a passenger mode to calibrate a collision mitigation system to reduce energy consumption by braking less often.

In some implementations, a collision mitigation system can include a plurality of service-type modes (e.g., for when the vehicle is operating in a service mode) to calibrate the collision mitigation system based at least in part on one or more preference(s) indicated by a service-type mode. For example, a service-type mode for testing an autonomy computing system of an autonomous vehicle can calibrate a collision mitigation system to report a potential collision to the autonomy computing system and to not automatically control the autonomous vehicle to execute a braking maneuver. In another example, a service-type mode for testing a human-machine interface system of an autonomous vehicle can calibrate a collision mitigation system to indicate a potential collision by cycling through each indicator on-board the autonomous vehicle.

The systems and methods described herein can provide a number of technical effects and benefits. For instance, systems and methods for switching between a plurality of operating modes on a collision mitigation system on-board an autonomous vehicle can have a technical effect of improving efficiency and flexibility in implementation of supplemental vehicle safety technology. An autonomous vehicle can be subject to a multitude of operating scenarios (e.g., an operating scenario for each driver, passenger, and service-type). By calibrating a collision mitigation system of an autonomous vehicle to adjust how the collision mitigation system responds to a potential collision, the autonomous vehicle can be optimally configured for each operating scenario. Additionally, by storing a plurality of operating modes and related information in a configurable data structure, operating modes can be easily added, modified, or removed as some operating scenarios become obsolete and new operating scenarios become apparent.

Systems and methods for switching among a plurality of operating modes on a collision mitigation system on-board an autonomous vehicle can also have a technical effect of reducing false positives and false negatives. When an autonomous vehicle is operating in autonomous mode, a collision mitigation system can inform an autonomy computing system of the autonomous vehicle immediately upon detecting each potential collision. This can generate false positives since some potential collisions can have a higher chance of occurring than other potential collisions. However, if the collision mitigation system does not inform the autonomy computing system of each potential collision that it detects, this can generate false negatives. Similarly, when an autonomous vehicle is operating in manual mode, a driver can react adversely to a high volume of false positives or false negatives. By enabling an autonomous vehicle to calibrate a collision mitigation system in accordance with an operating mode of the autonomous vehicle, different response characteristics can be set for autonomous mode and manual mode operation of the autonomous vehicle to reduce false positives and false negatives in each operating mode.

The systems and methods of the present disclosure also provide an improvement to vehicle computing technology, such as autonomous vehicle computing technology. For instance, the systems and methods herein enable the vehicle technology to adjust response characteristics of an autonomous vehicle according to an operating mode of the autonomous vehicle. For example, the systems and methods can allow one or more computing device(s) (e.g., of a collision mitigation system) on-board an autonomous vehicle to detect and avoid a potential collision based at least in part on an operating mode of the autonomous vehicle. As described herein, the autonomous vehicle can be configured to communicate data indicative of a potential collision and one or more control signals to avoid the potential collision of a collision mitigation system on-board the autonomous vehicle to one or more other system(s) on-board the autonomous system. The computing device(s) can determine one or more response characteristic(s) associated with an operating mode of the autonomous vehicle and control the autonomous vehicle based at least in part on the one or more response characteristic(s). This can allow the autonomous vehicle to more effectively inform the one or more system(s) on-board the autonomous vehicle to avoid the potential collision.

Moreover, the computing device(s) can be included in a collision mitigation system that is separate and apart from the other systems on-board the autonomous vehicle (e.g., autonomy computing system, vehicle interface system). As such, the collision mitigation system can include a simplified hardware architecture that is easier to upgrade, implement mode/redundancy checks, etc. This can also allow the computing device(s) to focus its computational resources on detecting and mitigating potential collisions, rather than allocating its resources to perform other vehicle functions (e.g., autonomous motion planning, motion plan implementation). Such use of resources can allow the computing device(s) to provide a more efficient, reliable, and accurate response to an event. Additionally, the other systems onboard the autonomous vehicle can focus on their core functions, rather than allocating resources to the functions of the collision mitigation system. Thus, the systems and methods of the present disclosure can save the computational resources of these other vehicle systems, while increasing performance of the collision mitigation system.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 103. In some implementations, the system 100 can include an operations computing system 104 that is remote from the vehicle 103.

The vehicle 103 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 103 can be an autonomous vehicle that can drive, navigate, operate, etc. with minimal and/or no interaction from a human driver. For instance, the vehicle 103 can be configured to operate in a plurality of operating modes 106A-C. The vehicle 103 can be configured to operate in a fully autonomous (e.g., self-driving) operating mode 106A in which the vehicle 103 can drive and navigate with no input from a user present in the vehicle 103. The vehicle 103 can be configured to operate in a semi-autonomous operating mode 106B in which the vehicle 103 can operate with some input from a user present in the vehicle. In some implementations, the vehicle 103 can enter into a manual operating mode 106C in which the vehicle 103 is fully controllable by a user (e.g., human driver) and can be prohibited from performing autonomous navigation (e.g., autonomous driving). In some implementations, the vehicle 103 can be configured to operate in one or more additional operating mode(s). The additional operating mode(s) can include, for example, operating mode(s) indicative of one or more preferences of a driver, passenger, or other operator(s) of the vehicle 103, operating mode(s) indicative of a service mode, etc.

The operating mode of the vehicle 103 can be adjusted in a variety of manners. In some implementations, the operating mode of the vehicle 103 can be selected remotely, off board the vehicle 103. For example, an entity associated with the vehicle 103 (e.g., a service provider) can utilize an operations computing system 104 to manage the vehicle 103 (and/or an associated fleet). The operations computing system 104 can send a communication to the vehicle 103 instructing the vehicle 103 to enter into, exit from, maintain, etc. an operating mode. By way of example, the operations computing system 104 can send a communication to the vehicle 103 instructing the vehicle 103 to enter into the fully autonomous operating mode 106A when providing a transportation (e.g., rideshare) service to a user. In some implementations, the operating mode of the vehicle 103 can be set onboard and/or near the vehicle 103. For example, the operating mode of the vehicle 103 can be selected via a secure interface (e.g., physical switch interface, graphical user interface) onboard the vehicle 103 and/or associated with a computing device proximate to the vehicle 103 (e.g., a tablet operated by authorized personnel located near the vehicle 103).

The vehicle computing system 102 can include one or more computing devices located onboard the vehicle 103 (e.g., located on and/or within the vehicle 103). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 103 (e.g., its computing system, one or more processors, etc.) to perform operations and functions, such as those described herein.

As shown in FIG. 1, the vehicle 103 can include one or more sensors 108, an autonomy computing system 110, vehicle control system 112, human-machine interface system 134, mode manager 136, and collision mitigation system 138. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 114 associated with one or more objects that are proximate to the vehicle 103 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 114 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 103. The sensor data 114 can be indicative of locations associated with the object(s) within the surrounding environment of the vehicle 103 at one or more times. The sensor(s) 108 can provide the sensor data 114 to the autonomy computing system 110.

Figure 2:
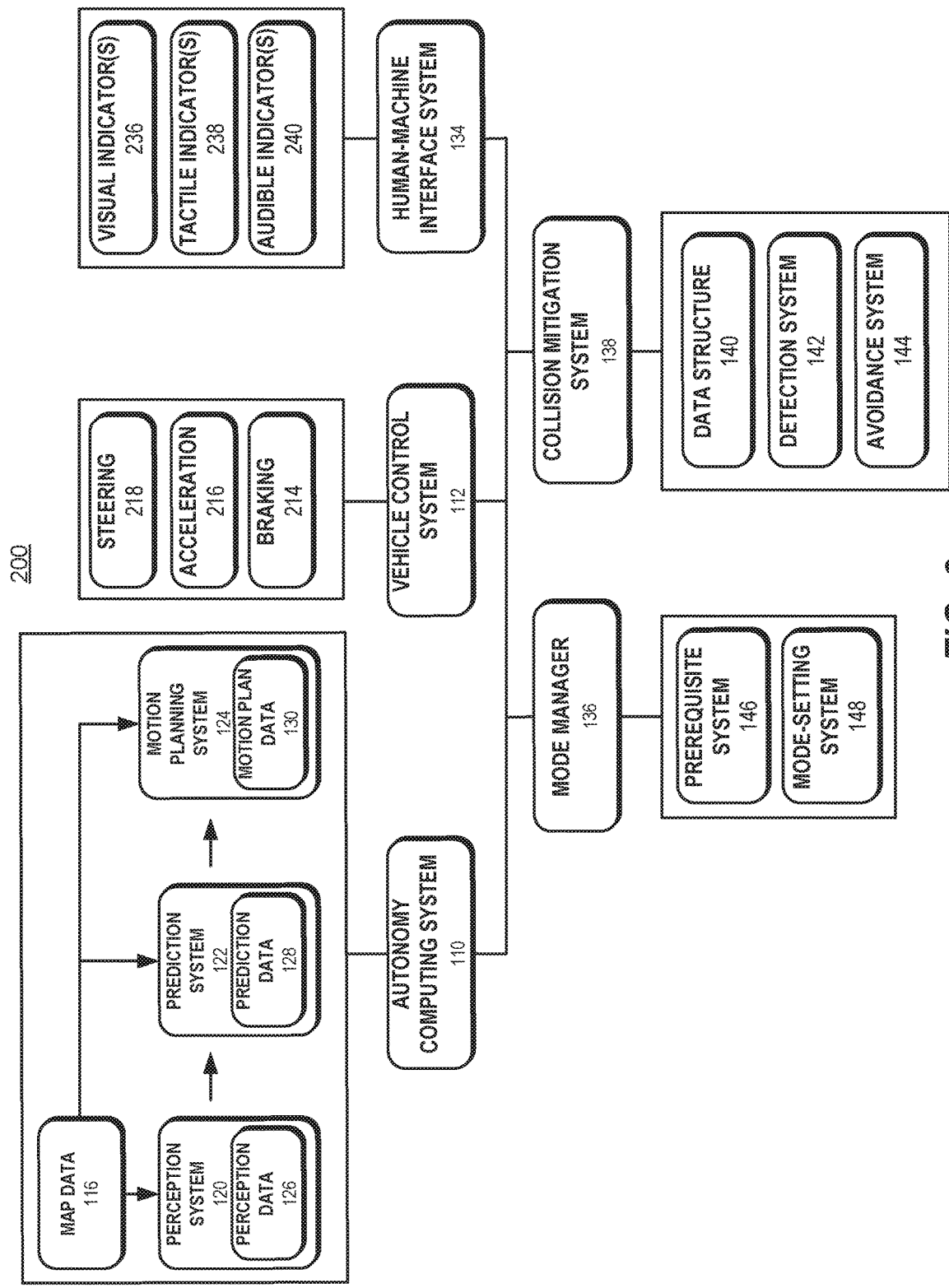
FIG. 2 depicts an example vehicle control system for selecting an operating mode and controlling an autonomous vehicle to avoid a potential collision based at least in part on the operating mode according to example embodiments of the present disclosure.

As shown in FIG. 2, the autonomy computing system 110 can retrieve or otherwise obtain map data 116, in addition to the sensor data 114. The map data 116 can provide detailed information about the surrounding environment of the vehicle 103. For example, the map data 116 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 103 in comprehending and perceiving its surrounding environment and its relationship thereto.

The autonomy computing system 110 can include a perception system 120, a prediction system 122, a motion planning system 124, and/or other systems that cooperate to perceive the surrounding environment of the vehicle 103 and determine a motion plan for controlling the motion of the vehicle 103 accordingly. For example, the autonomy computing system 110 can receive the sensor data 114 from the sensor(s) 108, attempt to comprehend the surrounding environment by performing various processing techniques on the sensor data 114 (and/or other data), and generate an appropriate motion plan through such surrounding environment.

The autonomy computing system 110 can control the one or more vehicle control systems 112 to operate the vehicle 103 according to the motion plan.

The autonomy computing system 110 can identify one or more objects that are proximate to the vehicle 103 based at least in part on the sensor data 114 and/or the map data 116. For example, the perception system 120 can obtain perception data 126 descriptive of a current state of an object that is proximate to the vehicle 103. The perception data 126 for each object can describe, for example, an estimate of the object's: current location (also referred to as position); current speed (also referred to as velocity); current acceleration; current heading; current orientation; size/footprint (e.g., as represented by a bounding polygon); class (e.g., pedestrian class vs. vehicle class vs. bicycle class), and/or other state information. In some implementations, the perception system 120 can determine perception data 126 for each object over a number of iterations. In particular, the perception system 120 can update the perception data 126 for each object at each iteration. Thus, the perception system 120 can detect and track objects (e.g., vehicles, pedestrians, bicycles, and the like) that are proximate to the autonomous vehicle 103 over time. The perception system 120 can provide the perception data 126 to the prediction system 122 (e.g., for predicting the movement of an object).

The prediction system 122 can create predicted data 128 associated with each of the respective one or more objects proximate to the vehicle 103. The predicted data 128 can be indicative of one or more predicted future locations of each respective object. The predicted data 128 can be indicative of a predicted path (e.g., predicted trajectory) of at least one object within the surrounding environment of the vehicle 103. For example, the predicted path (e.g., trajectory) can indicate a path along which the respective object is predicted to travel over time (and/or the speed at which the object is predicted to travel along the predicted path). The prediction system 122 can provide the predicted data 128 associated with the object(s) to the motion planning system 124.

The motion planning system 124 can determine a motion plan for the vehicle 103 based at least in part on the predicted data 128 (and/or other data), and save the motion plan as motion plan data 130. The motion plan data 130 can include vehicle actions with respect to the objects proximate to the vehicle 103 as well as the predicted movements. For instance, the motion planning system 124 can implement an optimization algorithm that considers cost data associated with a vehicle action as well as other objective functions (e.g., based on speed limits, traffic lights, etc.), if any, to determine optimized variables that make up the motion plan data 130. By way of example, the motion planning system 124 can determine that the vehicle 103 can perform a certain action (e.g., pass an object) without increasing the potential risk to the vehicle 103 and/or violating any traffic laws (e.g., speed limits, lane boundaries, signage). The motion plan data 130 can include a planned trajectory, speed, acceleration, etc. of the vehicle 103.

The motion planning system 124 can provide at least a portion of the motion plan data 130 that indicates one or more vehicle actions, a planned trajectory, and/or other operating parameters to the vehicle control system(s) 112 to implement the motion plan for the vehicle 103. For instance, the vehicle 103 can include a mobility controller configured to translate the motion plan data 130 into instructions. By way of example, the mobility controller can translate the motion plan data 130 into instructions to adjust the steering of the vehicle 103 "X" degrees, apply a certain magnitude of braking force, etc. The mobility controller can send one or more control signals to the responsible vehicle control sub-system (e.g., braking control system 214, steering control system 218, acceleration control system 216) to execute the instructions and implement the motion plan.

The vehicle 103 can include a communications system 132 configured to allow the vehicle computing system 102 (and its computing device(s)) to communicate with other computing devices. The vehicle computing system 102 can use the communications system 132 (e.g., shown in FIG. 1) to communicate with the operations computing system 104 and/or one or more other remote computing device(s) over one or more networks (e.g., via one or more wireless signal connections). In some implementations, the communications system 132 can allow communication among one or more of the system(s) on-board the vehicle 103. The communications system 132 can include any suitable components for interfacing with one or more network(s), including, for example, transmitters, receivers, ports, controllers, antennas, and/or other suitable components that can help facilitate communication.

The vehicle 103 can include a human-machine interface system 134 (e.g., as shown in FIG. 2) configured to control one or more indicator(s). The human-machine interface system 134 can control one or more of visual indicator(s) 236 (e.g., light(s), display(s), etc.), tactile indicator(s) 238 (e.g., ultrasound emitter(s), vibration motor(s), etc.), and audible indicator(s) 240 (e.g., speaker(s), etc.) located on-board the vehicle 103. The human-machine interface system 134 can receive control signals from one or more system(s) on-board the vehicle 103 to control the one or more indicator(s). For example, if a trajectory of the vehicle 103 includes an upcoming left turn, then the autonomy computing system 110 can control the human-machine interface system 134 (e.g., via one or more control signal(s)) to activate a left turn signal light of the vehicle 103. In another example, a human driver can control the human-machine interface system 134 (e.g., via a turn signal lever) to activate a left turn signal light of the vehicle 103.

The vehicle 103 can include a mode manager 136 (e.g., as shown in FIG. 2) configured to control one or more sub-system(s) for managing an operating mode of the vehicle 103. For instance, the mode manager 136 can include a prerequisite system 146 and a mode-setting system 148. The mode manager 136 can receive a requested operating mode from one or more system(s) on-board the vehicle 103 (e.g., from the autonomy computing system 110, human-machine interface system 134, etc.). For example, if the autonomy computing system 110 encounters an error, the autonomy computing system 110 can send one or more control signal(s) to the mode manager 136 to switch an operating mode of the vehicle 103 from a fully autonomous operating mode 106A to a manual operating mode 106C. As another example, an operator (e.g., human driver) can control the human-machine interface system 134 to send one or more control signal(s) to the mode manager 136 to switch an operating mode of the vehicle 103 from a manual operating mode 106C to a fully autonomous operating mode 106A.

The mode manager 136 can compare the requested operating mode with a current operating mode of the vehicle 103, and if the requested operating mode is different from the current operating mode, then the mode manager 136 can determine one or more prerequisite(s) to switching the vehicle 103 to the requested operating mode. The mode manager 136 can determine whether the prerequisite(s) are met, and if so the mode manager 136 can provide one or more control signal(s) to one or more system(s) on-board the vehicle 103 to switch an operating mode of the vehicle 103 to the requested operating mode. By way of example, if a vehicle 103 is operating in fully autonomous operating mode 106A and receives a request to switch to manual operating mode 106C, then the mode manager 136 can determine that a prerequisite to switching the operating mode is an availability of a driver. The mode manager 136 can determine if this prerequisite is met by controlling the vehicle 103 to prompt an operator of the vehicle 103 to affirm that operator will take control of the vehicle 103. The mode manager 136 can determine yet another prerequisite to switching the operating mode is that the vehicle 103 is not currently executing a turning maneuver. The mode manager 136 can communicate with the vehicle control system 112 or other system(s) on-board the vehicle 103 to determine if this prerequisite is met. If the vehicle 103 is executing a turning maneuver, the mode manager 136 can wait for the turning maneuver to be completed, or the mode manager 136 can determine that the prerequisite is not met. As another example, the operations computing system 104 can send a communication to the vehicle 103 instructing the vehicle 103 to enter into the autonomous operating mode 106A when providing a rideshare service to a user. The mode manager 136 can determine one or more prerequisite(s) to entering the fully autonomous operating mode 106A, determine if the prerequisite(s) are met, and switch the vehicle to the fully autonomous operating mode 106A.

The vehicle 103 can include a collision mitigation system 138 (e.g., as shown in FIG. 2) configured to control one or more sub-system(s) for detecting an avoiding a potential collision. For instance, the collision mitigation system 138 can include a configurable data structure 140, collision detection system 142, and a collision avoidance system 144. The collision mitigation system 138 can monitor a surrounding environment of the vehicle 103 using one or more sensors (e.g., a Radio Detection and Ranging (RADAR) system, one or more cameras, and/or other types of image capture devices and/or sensors) to detect a potential collision between the vehicle 103 and an object in the surrounding environment. When a potential collision is detected, the collision mitigation system 138 can control the vehicle 103 to avoid the potential collision, based at least in part on an operating mode of the vehicle 103. For example, if vehicle 103 is operating in fully autonomous operating mode 106A and the collision mitigation system 138 detects a potential collision, the collision mitigation system 138 can provide information on the potential collision to the autonomy computing system 110 that can adjust a trajectory if the vehicle 103 to avoid the potential collision. For instance, to adjust the trajectory of the vehicle 103 such information can be provided to the motion planning system 124, which can consider the cost (e.g., very high cost, overriding/superseding cost, etc.) of colliding with another object when planning the motion of the vehicle 103. As such, the motion planning system 124 can create a motion plan 130 by which the vehicle 103 follows a trajectory to avoid the collision. As another example, if vehicle 103 is operating in manual mode 106C and the collision mitigation system 136 detects a potential collision, the collision mitigation system 138 can control the human-machine interface system 134 to display a warning light to operator(s) of the vehicle 103.

In some implementations, the collision mitigation system 138 can control a motion of the vehicle 103 to avoid a potential collision. For example, if a potential collision persists for a time after the collision mitigation system 138 provides information on the potential collision to the autonomy computing system 110, then the collision mitigation system 138 can provide one or more control signal(s) to control the vehicle 103 to execute a braking maneuver. As another example, if a potential collision persists for a time after the collision mitigation system 138 controls the vehicle 103 to display a warning light, then the collision mitigation system 138 can provide one or more control signal(s) to control the vehicle 103 to execute a braking maneuver.

Figure 3:
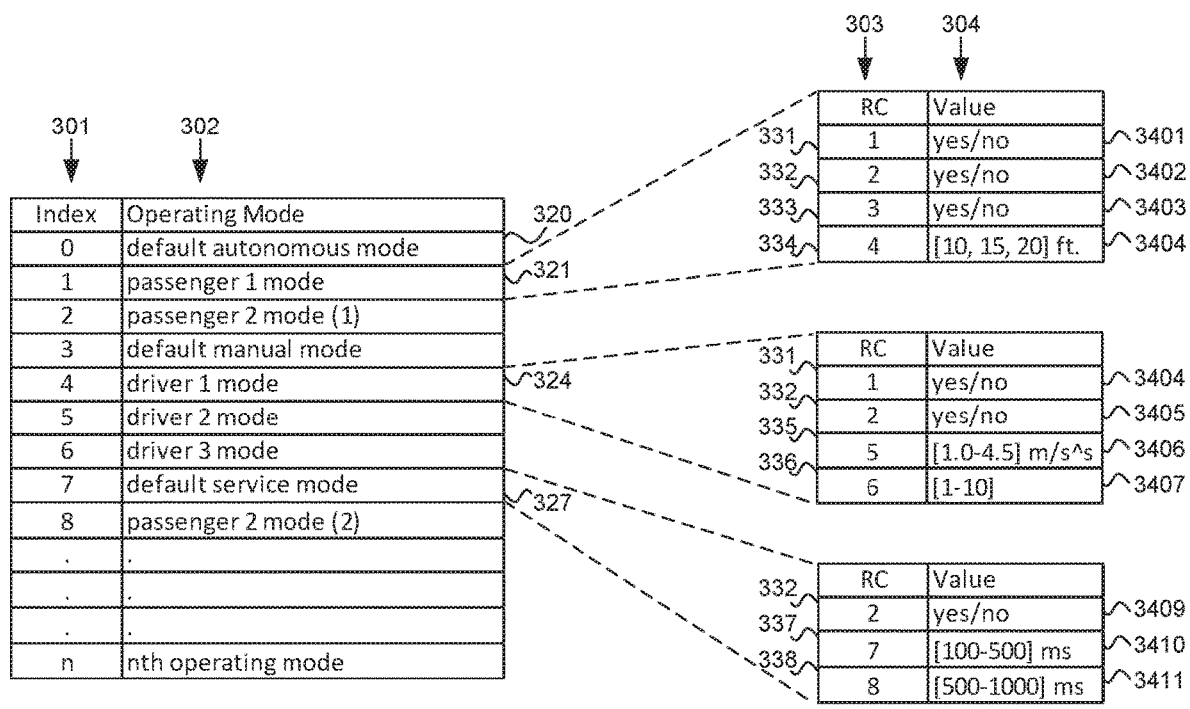
FIG. 3 depicts a configurable data structure for storing one or more operating mode(s) according to example embodiments of the present disclosure.

As shown in FIG. 3, the configurable data structure 140 can store one or more operating mode(s) 302, one or more response characteristic(s) 303, and one or more corresponding value(s) 304. The configurable data structure 300 can store the operating mode(s) 302 in relation to an index 301. For example, the operating mode(s) 302 can include passenger 1 mode 321, driver 1 mode 324, and default service mode 327. Each of the operating mode(s) 302 is associated with one or more response characteristic(s) 303. For example, the passenger 1 mode 321 is associated with response characteristic(s) 331, 332, 333, and 334; the driver 1 mode 324 is associated with response characteristic(s) 331, 332, 335, and 336; and the default service mode 327 is associated with response characteristic(s) 332, 337, and 338. Each of the response characteristic(s) 303 is associated with corresponding value(s) 304. For example, response characteristic(s) 331, 332, 333, and 334 (e.g., for the passenger 1 mode) are associated with corresponding value(s) 3401, 3402, 3403, and 3404, respectively; response characteristic(s) 331, 332, 335, and 336 (e.g., for the driver 1 mode) are associated with corresponding value(s) 3405, 3406, 3407, and 3408, respectively; and response characteristic(s) 332, 337, and 338 (e.g., for the default service mode) are associated with corresponding value(s) 3409, 3410, and 3411, respectively. A response characteristic of the vehicle 103 can be associated with zero or more of the operating mode(s) 302. For example, response characteristic(s) 331 and 332 are associated with operating mode 321 and operating mode 324. As another example, the vehicle 103 can include one or more response characteristic(s) in addition to response characteristic(s) 331-338 that are not associated with any one of the operating mode(s) 302. Additionally, a response characteristic of the vehicle 103 can be associated with a range of values for each corresponding value. For example, response characteristic 331 represents whether the collision mitigation system 138 should control the human-machine interface system 134 to flash a warning light. The response characteristic 331 is associated with the range of values "yes/no." Accordingly, the corresponding values 3401 and 3405 can be either a "yes" or "no." Furthermore, each of the corresponding value(s) 304 is independent of one another. For example, the corresponding value 3401 can be "yes" and the corresponding value 3405 can be "no." As another example, response characteristic 334 represents a minimum distance to keep with other vehicles and is associated with the range of 10 feet, 15 feet, or 20 feet. As yet another example, response characteristic 335 represents a maximum acceleration for the vehicle 103 and is associated with the range between 1.0 and 4.0 m/s$^2$.

Figure 4A:
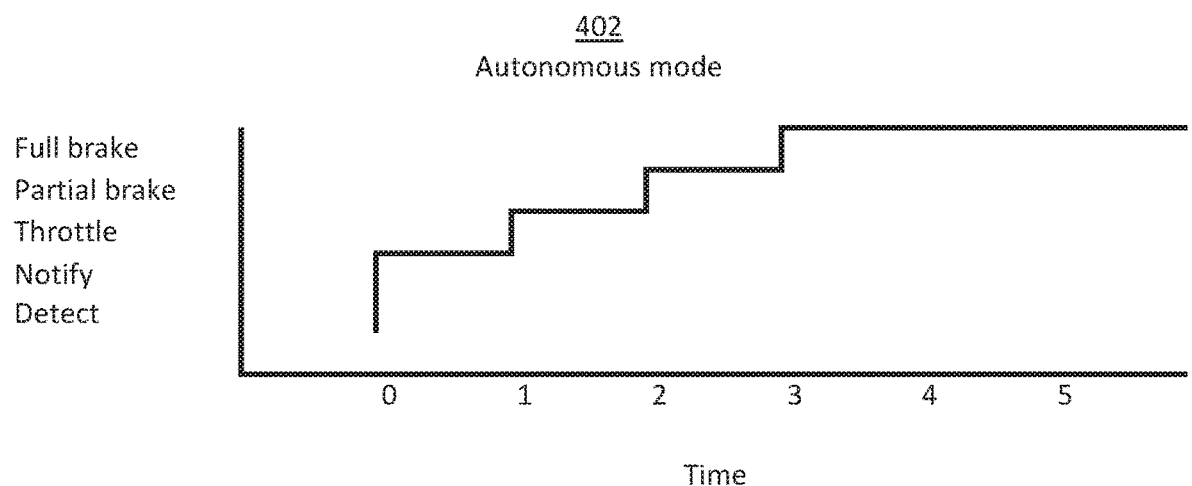
FIGS. 4A and 4B depict state diagrams of a collision mitigation system according to example embodiments of the present disclosure.
Figure 4B:
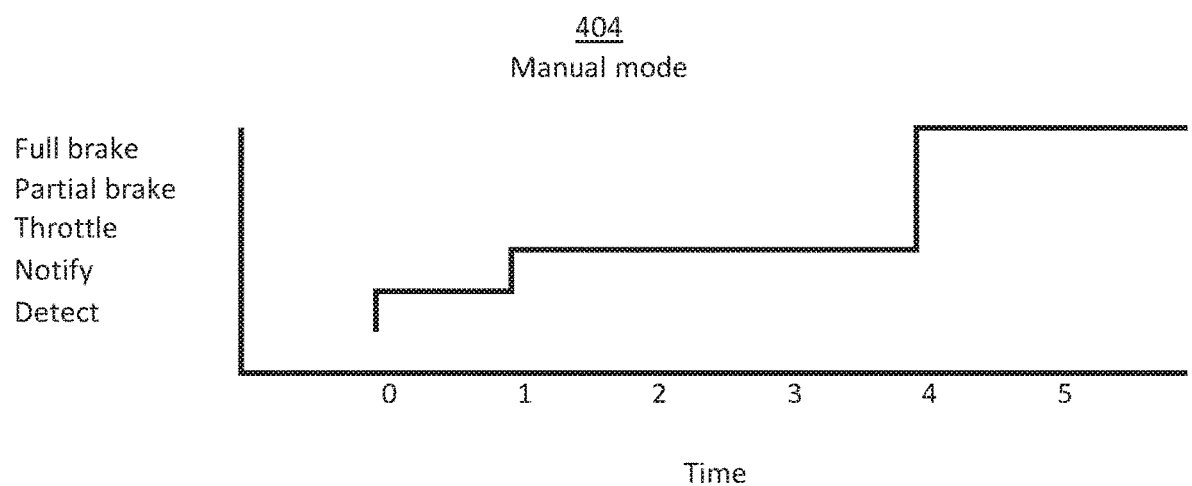

FIGS. 4A and 4B depict diagrams 402 and 404 illustrate a response of the vehicle 103 when the collision mitigation system 138 detects a potential collision. The response of the vehicle 103 can differ based at least in part on an operating mode of the vehicle 103. For example, FIG. 4A shows a response of the vehicle 103 when operating in fully autonomous mode 106A and FIG. 4B shows a response of the vehicle 103 when operating in manual mode 106C.

As shown in FIG. 4A, at time t=0 the collision mitigation system 138 detects a potential collision while the vehicle 103 is operating in fully autonomous mode 106A. Immediately upon detecting the potential collision, at t=0 the collision mitigation system 138 controls the vehicle 103 to by providing information on the potential collision to the autonomy computing system 110. The collision mitigation system 138 then waits for the autonomy computing system 110 to adjust a trajectory of the vehicle 103 to avoid the potential collision. At t=1, the collision mitigation system 138 checks if the potential collision persists. If the potential collision persists, the collision mitigation system 138 can continue to wait for the autonomy computing system 110. At t=2, the collision mitigation system 138 checks if the potential collision still persists. If the potential collision persists, the collision mitigation system 138 can control a motion of the vehicle 103 to avoid the potential collision by providing control signal(s) to the vehicle control system 112 to throttle the vehicle 103 (e.g., to decelerate the vehicle 103). At t=3, the collision mitigation system 138 checks if the potential collision still persists. If the potential collision persists, the collision mitigation system 138 provides control signal(s) to the vehicle control system 112 to execute a partial brake maneuver. At t=4, the collision mitigation system 138 checks if the potential collision still persists. If the potential collision persists, the collision mitigation system 138 can provide control signal(s) to the vehicle control system 112 to execute a full brake maneuver.

In some implementations, the duration between throttling at t=2 and executing a full brake at t=4 can be adjusted based at least in part on a response characteristic associated with the autonomous operating mode. For example, the vehicle 103 can include the response characteristic "maximum deceleration rate" and the fully autonomous mode 106A of the vehicle 103 can be associated with this response characteristic. The collision mitigation system 138 can expand the time between throttling and executing a full brake if the corresponding value for "maximum deceleration rate" is low, or contract the time between throttling and executing a full brake if the corresponding value for "maximum deceleration rate" is high. Alternatively, the collision mitigation system 138 can control the motion of the vehicle 103 such that a deceleration of the vehicle 103 is less than the corresponding value for "maximum deceleration rate."

As shown in FIG. 4B, at time t=0 the collision mitigation system 138 detects a potential collision while the vehicle 103 is operating in manual mode 106C. Upon detecting the potential collision, the collision mitigation system 138 waits for a driver to control the vehicle 103 to avoid the potential collision. At t=1, the collision mitigation system 138 checks if the potential collision persists. If the potential collision persists, the collision mitigation system 138 can control the human-machine interface system 134 to display a warning light in case the driver has not noticed the potential collision. At t=2, the collision mitigation system 138 checks if the potential collision still persists. If the potential collision persists, the collision mitigation system 138 can continue waiting for the driver to control the vehicle 103 to avoid the potential collision. At t=3, the collision mitigation system 138 checks if the potential collision still persists. If the potential collision persists, the collision mitigation system 138 can continue waiting for the driver to control the vehicle 103 to avoid the potential collision. At t=4, the collision mitigation system 138 checks if the potential collision still persists. If the potential collision persists, the collision mitigation system 138 can provide control signal(s) to the vehicle control system 112 to execute a full brake maneuver.

In some implementations, the duration between notifying the driver at t=2 and executing a full brake at t=4 can be adjusted based at least in part on a response characteristic associated with the manual operating mode 106C. For example, the vehicle 103 can include the response characteristic "maximum deceleration rate" and the manual operating mode 160C of the vehicle 103 can be associated with this response characteristic. The collision mitigation system 138 can expand the time between throttling and executing a full brake if the corresponding value for "maximum deceleration rate" is high, or contract the time between throttling and executing a full brake if the corresponding value for "maximum deceleration rate" is low. Alternatively, the collision mitigation system 138 can control the motion of the vehicle 103 such that a deceleration of the vehicle 103 is less than the corresponding value for "maximum deceleration rate."

Figure 5:
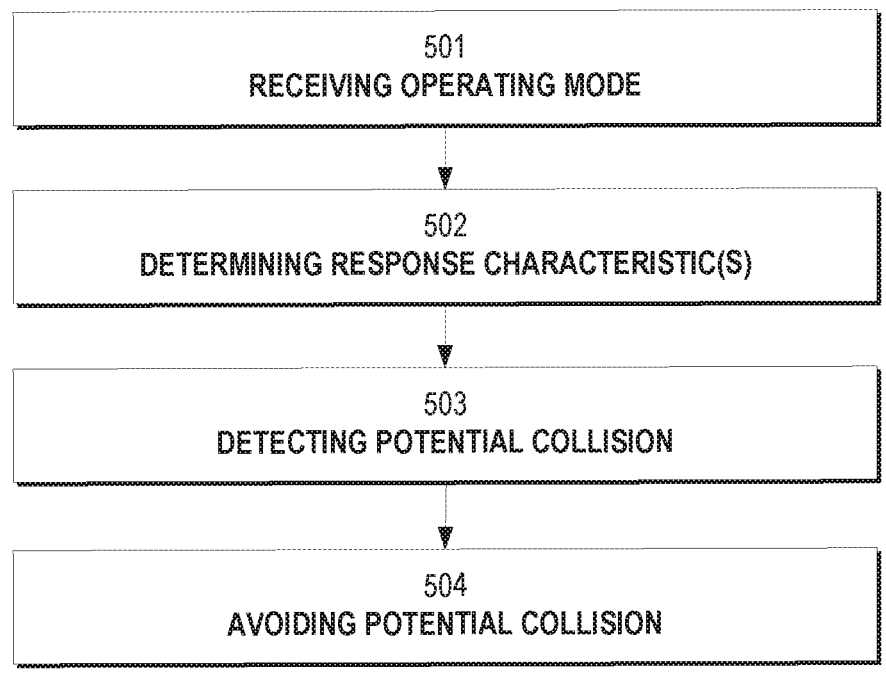
FIG. 5 depicts a flow diagram of switching an operating mode and controlling an autonomous vehicle based at least in part on the operating mode according to example embodiments of the present disclosure.

FIG. 5 depicts a flow diagram of an example method 500 of controlling the vehicle 103 based at least in part on an operating mode of the vehicle 103 according to example embodiments of the present disclosure. One or more portion(s) of the method 500 can be implemented by one or more computing device(s) such as, for example, the computing device(s) 601 shown in FIG. 6. Moreover, one or more portion(s) of the method 500 can be implemented as an algorithm on the hardware components of the device(s) described herein (e.g., as in FIGS. 1 and 6) to, for example, switch an operating mode of the vehicle 103. FIG. 5 depicts elements performed in a particular order for purposes of illustration and discussion. Those of ordinary skill in the art, using the disclosures provided herein, will understand that the elements of any of the methods (e.g., of FIG. 5) discussed herein can be adapted, rearranged, expanded, omitted, combined, and/or modified in various ways without deviating from the scope of the present disclosure.

At (501), the method 500 can include receiving an operating mode. For example, the collision mitigation system 138 can receive data indicative of the operating mode from the mode manager 136 when the mode manager 136 sets the operating mode.

At (502), the method 500 can include determining response characteristic(s). For example, the collision mitigation system 138 can search the configurable data structure 140 for an operation mode 302 that matches the received operating mode. If a match is found, the collision mitigation system 138 can determine the response characteristic(s) 303 associated with the operating mode.

At (503), the method 500 can include detecting a potential collision between the vehicle 103 and an object in the surrounding environment. For example, the collision mitigation system 138 can monitor the surrounding environment of the vehicle 103 using one or more sensors (e.g., a Radio Detection and Ranging (RADAR) system, one or more cameras, and/or other types of image capture devices and/or sensors) to detect the potential collision.

At (504), the method 500 can include controlling the vehicle 103 to avoid the potential collision. For example, if the operating mode of the vehicle 103 is default autonomous mode 320, then one or more response characteristic(s) 303 and corresponding value(s) 304 associated with default autonomous mode 320 can indicate that the collision mitigation system 138 is to immediately provide information on the potential collision to the autonomy computing system 110. As another example, if the operating mode of the vehicle 103 is driver 1 mode 324, then one or more response characteristic(s) 303 and corresponding value(s) 304 associated with driver 1 mode 324 can indicate that the collision mitigation system 138 is to control the human-machine interface system 134 to indicate the potential collision after a first duration of time, and to control the vehicle control system 112 to execute a full brake maneuver after a second duration of time.

Figure 6:
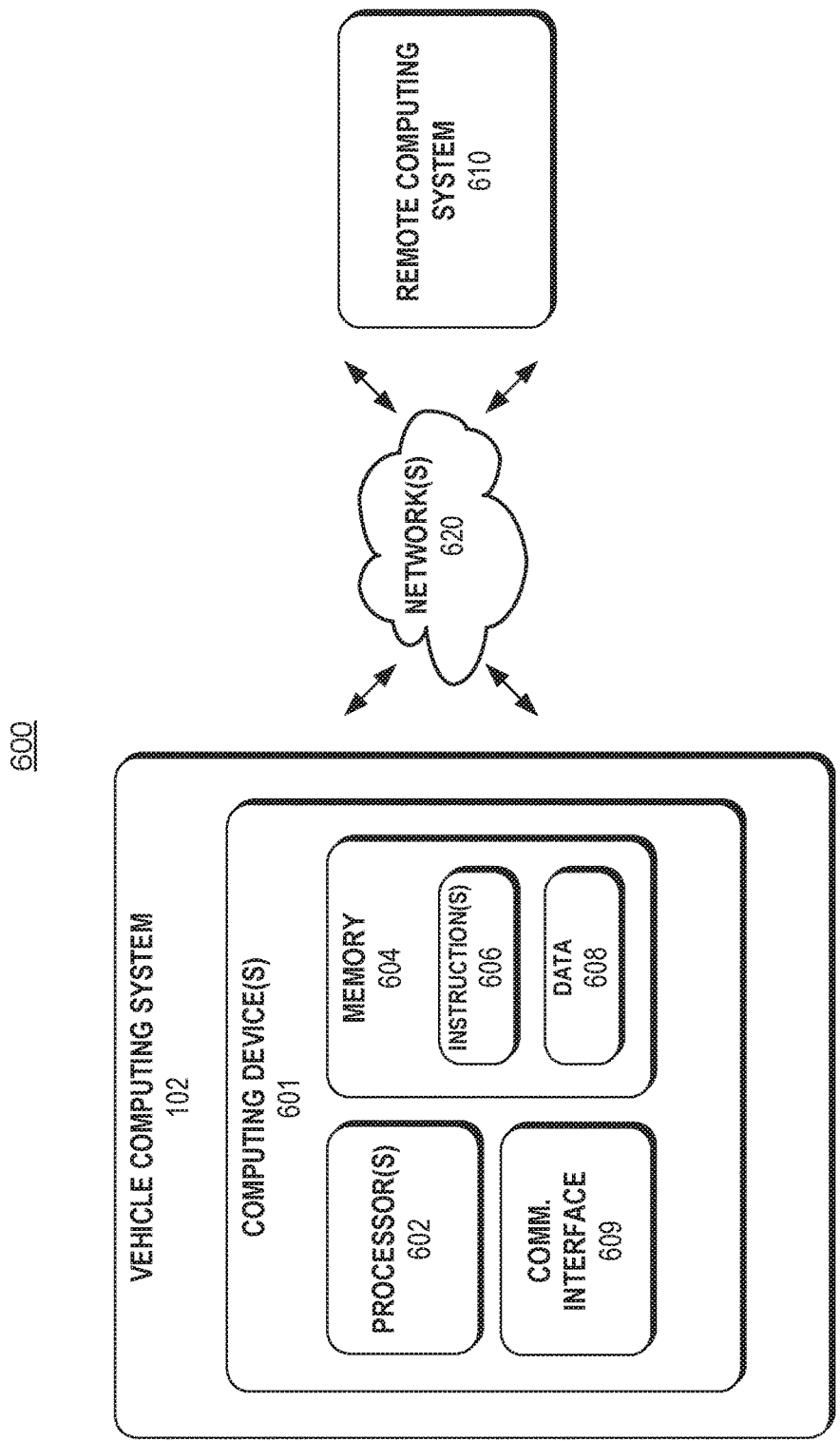
FIG. 6 depicts example system components according to example embodiments of the present disclosure.

FIG. 6 depicts an example computing system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include the vehicle computing system 102 of the vehicle 103 and, in some implementations, a remote computing system 610 including one or more remote computing device(s) that are remote from the vehicle 103 (e.g., the operations computing system 104) that can be communicatively coupled to one another over one or more networks 620. The remote computing system 610 can be associated with a central operations system and/or an entity associated with the vehicle 103 such as, for example, a vehicle owner, vehicle manager, fleet operator, service provider, etc.

The computing device(s) 601 of the vehicle computing system 102 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the vehicle 103 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 103 can store instructions 606 that when executed by the one or more processors 602 on-board the vehicle 103 cause the one or more processors 602 (the vehicle computing system 102) to perform operations such as any of the operations and functions of the vehicle computing system 102, as described herein, the operations for controlling the vehicle 103 based at least in part on an operating mode of the vehicle 103.

The memory 604 can store data 608 that can be obtained, received, accessed, written, manipulated, created, and/or stored. The data 608 can include, for instance, data associated with an operating mode of the vehicle, data associated with response characteristics, data structures (as described herein), sensor data, perception data, prediction data, motion planning data, and/or other data/information as described herein. In some implementations, the computing device(s) 601 can obtain data from one or more memory device(s) that are remote from the vehicle 103.

The computing device(s) 601 can also include a communication interface 609 used to communicate with one or more other system(s) on-board the vehicle 103 and/or a remote computing device that is remote from the vehicle 103 (e.g., of remote computing system 610). The communication interface 609 can include any circuits, components, software, etc. for communicating via one or more networks (e.g., 620). In some implementations, the communication interface 609 can include, for example, one or more of a communications controller, receiver, transceiver, transmitter, port, conductors, software, and/or hardware for communicating data.

The network(s) 620 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the vehicle computing system 102. The remote computing devices can include components (e.g., processor(s), memory, instructions, data) similar to that described herein for the computing device(s) 601. Moreover, the remote computing system 610 can be configured to perform one or more operations of the operations computing system 104, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for autonomous vehicle control, the method comprising:

receiving, by a computing system comprising one or more computing devices, data indicative of an operating mode of the autonomous vehicle, the autonomous vehicle configured to operate in a plurality of operating modes associated with an autonomy computing system of the autonomous vehicle;

determining, by the computing system, one or more response characteristics for reacting to a potential collision based at least in part on the operating mode of the autonomous vehicle and an operating mode of a collision mitigation system, each response characteristic indicative of a response by indicating how the collision mitigation system onboard the autonomous vehicle responds to the potential collision with an object in an environment proximate to the autonomous vehicle, wherein the collision mitigation system is separate from the autonomy system of the autonomous vehicle;

sending, by the computing system, one or more control signals to one or more other systems onboard the autonomous vehicle based at least in part on the one or more response characteristics; and controlling, by the computing system, the autonomous vehicle based at least in part on the one or more control signals.

2. The computer-implemented method of claim 1, wherein the one or more control signals are indicative of a detection of the potential collision.

3. The computer-implemented method of claim 1, wherein:

sending the one or more control signals comprises:

sending, by the computing system, one or more first control signals to the autonomy computing system at a first time when the operating mode of the autonomous vehicle is an autonomous mode; and sending, by the computing system, one or more second control signals to the one or more other systems onboard the autonomous vehicle, in response to the one or more first control signals, the one or more second control signals indicating one or more vehicle maneuvers to control the autonomous vehicle.

4. The computer-implemented method of claim 1, wherein:

sending the one or more control signals comprises sending, by the computing system, one or more third control signals to a human-machine interface system onboard the autonomous vehicle at a second time when the operating mode of the autonomous vehicle is a manual driving mode; and wherein controlling the autonomous vehicle based at least in part on the one or more control signals comprises controlling the autonomous vehicle based at least in part on an input from an operator of the autonomous vehicle subsequent to sending the one or more third control signals.

5. The computer-implemented method of claim 1, wherein the one or more control signals indicate one or more vehicle maneuvers to avoid the potential collision; and wherein controlling the autonomous vehicle based at least in part on the one or more control signals comprises controlling the autonomous vehicle to avoid the potential collision based at least in part on the one or more control signals.

6. The computer-implemented method of claim 5, further comprising:

monitoring, by the computing system, the potential collision for a first duration of time; and sending, by the computing system, the one or more control signals to the one or more other systems when the potential collision is determined to persist after the first duration of time.

7. The computer-implemented method of claim 1, further comprising:

detecting, by the computing system, the potential collision between the autonomous vehicle and the object in the environment proximate to the autonomous vehicle, wherein the potential collision is detected by the autonomy computing system independent of the detection by the collision mitigation system.

8. The computer-implemented method of claim 7, wherein detecting the potential collision between the autonomous vehicle and the object in the environment proximate to the autonomous vehicle comprises:

obtaining, by the computing system, trajectory information associated with the autonomous vehicle from the autonomy computing system;

determining, by the computing system, one or more regions of interest in the environment proximate to the autonomous vehicle based at least in part on the trajectory information; and detecting, by the computing system, the potential collision within the one or more regions of interest while monitoring the one or more regions of interest for the potential collision.

9. A computing system for autonomous vehicle control, the system comprising:

one or more processors; and one or more computer readable media that collectively store instructions that when executed by the one or more processors cause the computing system to perform operations, the operations comprising:

receiving data indicative of an operating mode of an autonomous vehicle, wherein the autonomous vehicle is configured to operate in a plurality of operating modes associated with an autonomy computing system of the autonomous vehicle;

determining one or more response characteristics for reacting to a potential collision based at least in part on the operating mode of the autonomous vehicle and an operating mode of a collision mitigation system, each response characteristic indicative of a response by indicating how the collision mitigation system onboard the autonomous vehicle responds to the potential collision with an object in an environment proximate to the autonomous vehicle, wherein the collision mitigation system is separate from the autonomy system of the autonomous vehicle;

sending one or more control signals to one or more other systems onboard the autonomous vehicle based at least in part on the one or more response characteristics; and controlling the autonomous vehicle based at least in part on the one or more control signals.

10. The computing system of claim 9, wherein:

sending the one or more control signals comprises:

sending one or more first control signals to the autonomy computing system at a first time when the operating mode of the autonomous vehicle is an autonomous mode; and sending one or more second control signals to the one or more other systems onboard the autonomous vehicle, in response to the one or more first control signals, the one or more second control signals indicating one or more vehicle maneuvers to control the autonomous vehicle.

11. The computing system of claim 9, wherein:

sending the one or more control signals comprises sending one or more third control signals from the collision mitigation system to a human-machine interface system onboard the autonomous vehicle at a second time when the operating mode of the autonomous vehicle is a manual driving mode; and wherein controlling the autonomous vehicle based at least in part on the one or more control signals comprises controlling the autonomous vehicle based at least in part on an input from an operator of the autonomous vehicle subsequent to sending the one or more third control signals.

12. The computing system of claim 9, wherein the one or more control signals indicate one or more vehicle maneuvers to avoid the potential collision; and
wherein controlling the autonomous vehicle based at least in part on the one or more control signals comprises controlling the autonomous vehicle to avoid the potential collision based at least in part on the one or more control signals.

13. The computing system of claim 10, wherein the operations further comprise:
monitoring, at the collision mitigation system, the potential collision for a first duration of time; and
sending the control signals from the collision mitigation system to the one or more other systems when the potential collision is determined to persist after the first duration of time.

14. The computing system of claim 9, wherein the operations further comprise:
detecting the potential collision at the collision mitigation system, and
detecting the potential collision at the autonomy computing system independent of the detection at the collision mitigation system.

15. An autonomous vehicle, comprising:
one or more processors; and
one or more computer readable media that collectively store instructions that when executed by the one or more processors cause the autonomous vehicle to perform operations, the operations comprising:
receiving data indicative of an operating mode of the autonomous vehicle, wherein the autonomous vehicle is configured to operate in a plurality of operating modes associated with an autonomy computing system of the autonomous vehicle;
determining one or more response characteristics for reacting to a potential collision based at least in part on the operating mode of the autonomous vehicle and an operating mode of a collision mitigation system, each response characteristic indicative of a response by indicating how the collision mitigation system onboard the autonomous vehicle responds to the potential collision with an object in an environment proximate to the autonomous vehicle, wherein the collision mitigation system is separate from the autonomy system of the autonomous vehicle;
sending one or more control signals to one or more other systems onboard the autonomous vehicle based at least in part on the one or more response characteristics; and
controlling the autonomous vehicle based at least in part on the one or more control signals.

16. The autonomous vehicle of claim 15, wherein:
sending the one or more control signals comprises:
sending one or more first control signals from the collision mitigation system to the autonomy computing system at a first time when the operating mode of the autonomous vehicle is an autonomous mode; and
sending one or more second control signals from the autonomy computing system to the one or more other systems onboard the autonomous vehicle, in response to the one or more first control signals, the one or more second control signals indicating one or more vehicle maneuvers to control the autonomous vehicle.

17. The autonomous vehicle of claim 15, wherein:
sending the one or more control signals comprises sending one or more third control signals from the collision mitigation system to a human-machine interface system onboard the autonomous vehicle at a second time when the operating mode of the autonomous vehicle is a manual driving mode; and
wherein controlling the autonomous vehicle based at least in part on the one or more control signals comprises controlling the autonomous vehicle based at least in part on an input from an operator of the autonomous vehicle subsequent to sending the one or more third control signals.

18. The autonomous vehicle of claim 15, wherein the operations further comprise:
sending one or more control signals from the collision mitigation system to the one or more other systems onboard the autonomous vehicle based at least in part on the one or more response characteristics, the one or more control signals indicating one or more vehicle maneuvers to avoid the potential collision; and
controlling the autonomous vehicle to avoid the potential collision based at least in part on the one or more control signals.

19. The autonomous vehicle of claim 18, wherein the operations further comprise:
monitoring, at the collision mitigation system, the potential collision for a first duration of time; and
sending the control signals from the collision mitigation system to the one or more other systems when the potential collision is determined to persist after the first duration of time.

20. The autonomous vehicle of claim 15, wherein the operations further comprise:
detecting the potential collision at the collision mitigation system; and
detecting the potential collision at the autonomy computing system independent of the detection at the collision mitigation system.

* * * * *